(12) United States Patent
Shadbolt et al.

(10) Patent No.: US 7,600,977 B2
(45) Date of Patent: Oct. 13, 2009

(54) TURBINE BLADE TIP CAP

(75) Inventors: Simon Shadbolt, Worcestershire (GB);
Nick Podmore, Shipston-on-Stour (GB);
Stephen J. Jordan, Worcestershire
(GB); Kahwai G. Muriithi,
Simpsonville, SC (US); **Anthony C.
Thermos, Greer, SC (US); Joseph A.
Weber**, Simpsonville, SC (US)

(73) Assignee: General Electric Company,
Schenectady, NY (US)

( * ) Notice: Subject to any disclaimer, the term of this patent is extended or adjusted under 35 U.S.C. 154(b) by 386 days.

(21) Appl. No.: 11/429,262

(22) Filed: May 8, 2006

(65) Prior Publication Data

US 2007/0258825 A1 Nov. 8, 2007

(51) Int. Cl.
*F01D 5/20* (2006.01)
(52) U.S. Cl. .................. 416/224; 416/223 R; 415/173.1
(58) Field of Classification Search ............. 415/173.1, 415/173.2, 173.6; 416/223 R, 224, 228
See application file for complete search history.

(56) References Cited

U.S. PATENT DOCUMENTS

| | | | |
|---|---|---|---|
| 3,854,842 A | * | 12/1974 | Caudill ....................... 415/116 |
| 3,982,851 A | | 9/1976 | Andersen et al. |
| 4,010,531 A | | 3/1977 | Andersen et al. |
| 4,020,538 A | | 5/1977 | Dennis et al. |
| 4,177,010 A | * | 12/1979 | Greaves et al. ............ 416/97 R |
| 4,214,355 A | | 7/1980 | Zelahy |
| 4,247,254 A | | 1/1981 | Zelahy |
| 4,390,320 A | | 6/1983 | Eiswerth |
| 5,503,527 A | | 4/1996 | Lee et al. |
| 5,794,338 A | | 8/1998 | Bowden, Jr. et al. |
| 5,997,251 A | | 12/1999 | Lee |
| 6,179,556 B1 | | 1/2001 | Bunker |
| 6,276,597 B1 | | 8/2001 | Budinger et al. |
| 6,367,687 B1 | | 4/2002 | Reeves et al. |
| 6,558,119 B2 | | 5/2003 | Lee et al. |
| 6,915,840 B2 | | 7/2005 | Devine |
| 6,991,430 B2 | | 1/2006 | Stec et al. |
| 7,001,151 B2 | | 2/2006 | Wang et al. |

* cited by examiner

*Primary Examiner*—Edward Look
*Assistant Examiner*—Nathaniel Wiehe
(74) *Attorney, Agent, or Firm*—Nixon & Vanderhye, P.C.

(57) ABSTRACT

A method of manufacturing a turbine blade includes (a) supporting a turbine blade internal core support at opposite ends such that radially inner and outer ends of the turbine blade remain open during casting; (b) casting the blade including the airfoil portion, wherein the radially outer edge of the airfoil portion is inclined relative to horizontal; (c) machining the radially outer edge of the airfoil portion to form a peripheral shoulder about a radially outer opening in the airfoil portion; and (d) seating a tip cap on the peripheral shoulder and fixing the tip cap to the airfoil portion of the blade.

4 Claims, 4 Drawing Sheets

TURBINE BLADE TIP CAP

BACKGROUND OF THE INVENTION

This invention relates to turbine blade technology and, more specifically, to a replacement turbine blade having a discrete tip cap configuration that facilitates manufacture in a manner that increases blade life.

Some turbine components, such as rotor blades, have required replacement after one service interval (for example, three years) because of the inability to repair the component. For some turbine blades, the limiting factor is the integral "cast-in" tip cap design of the blades which requires that the core support used in casting the blade be internally supported by many small platinum pins that extend through the blade airfoil. In the finished blade, therefore, the platinum pin faces are exposed, flush with the exterior airfoil surfaces. At the end of a service interval, blades are typically stripped and re-coated. The platinum pins have to be masked during the stripping process to prevent chemical attack on the platinum. If the pins are not precisely masked, the stripping chemical will melt the pins, leaving minute holes in the airfoil surfaces. This leads to a problem known as "repair fallout" with as many as 25% of blades being disposed of rather than recoated.

BRIEF SUMMARY OF THE INVENTION

In an exemplary embodiment of this invention, replacement blades are provided that have a new tip cap configuration that eliminates the need for the platinum core support pins. More specifically, the cast-in tip cap design is eliminated so that both the radially inner and outer ends of the blades are open during casting. This means that the internal core support can be held at both ends of the blade, eliminating the need for internal core support pins. A discrete tip cap is then welded onto the outer end of the airfoil. To facilitate attachment, the outer end of the airfoil is provided with a peripheral shoulder on which a rimmed planar tip cap is seated and subsequently welded. An added benefit is that the welded tip cap also relieves stresses at the radially outer end of the blade. Further in this regard, the tip cap is supported and welded only about its peripheral edge, i.e., there is no underlying mid-span support.

Accordingly, in one aspect, the invention relates to a method of manufacturing a turbine blade comprising: (a) supporting a turbine blade internal core support at opposite ends such that radially inner and outer ends of the turbine blade remain open during casting; (b) casting the blade including the airfoil portion, wherein the radially outer edge of the airfoil portion is inclined relative to horizontal; (c) machining the radially outer edge of the airfoil portion to form a peripheral shoulder about a radially outer opening in the airfoil portion; (d) seating a tip cap on the peripheral shoulder and fixing the tip cap to the airfoil portion of the blade.

In another aspect, the invention relates to a method of manufacturing a turbine blade comprising: (a) supporting a turbine blade internal core support at opposite ends such that radially inner and outer ends of the turbine blade remain open during casting; (b) casting the blade including the airfoil portion, wherein the radially outer edge of the airfoil portion is inclined relative to horizontal; (c) machining the radially outer end of the airfoil portion to form a peripheral shoulder about a radially outer opening in the airfoil portion; (d) seating a tip cap having a reduced thickness at a trailing end thereof on the peripheral shoulder and electron-beam welding the tip cap to the airfoil portion of the blade.

In still another aspect, the present invention relates to a turbine blade comprising an airfoil portion defined by a leading edge, a trailing edge, a pressure side, a suction side and a radially outer edge inclined by about 20° horizontal; a discrete tip cap secured to the radially outer edge of the airfoil portion, a radially inner surface of the tip cap seated on a peripheral shoulder formed in the radially outer end of the airfoil portion.

The invention will now be described in detail in connection with the drawings identified below.

DETAILED DESCRIPTION OF THE INVENTION

Figure 1:
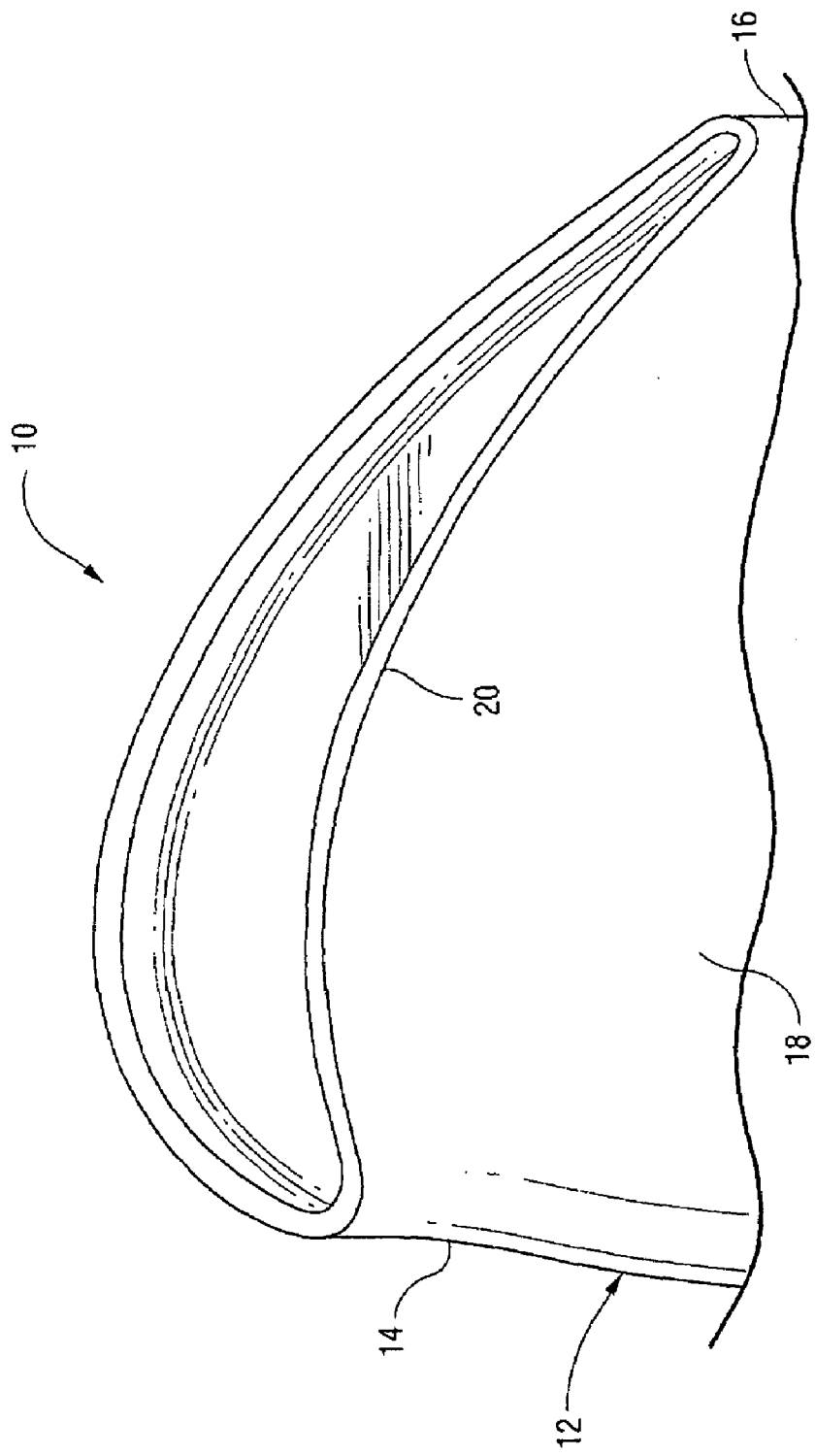
FIG. 1 is a partial perspective view of a known turbine blade manufactured with a cast-in tip cap.

FIG. 1 illustrates a known turbine blade 10 having an airfoil portion 12 as defined by a leading edge 14, a trailing edge 16, a pressure side 18 and a suction side 20. The blade is formed with an integral, cast-in tip cap 22. In such blade designs, the use of internal core support pins (not shown) is required to provide the necessary support during casting, since it is not possible to hold the core support from the radially outer end of the blade. The ends of the core support pins extend through the airfoil and lie flush with the airfoil exterior surface. As indicated above, these support pins often fail, i.e., melt, during an airfoil coating-stripping process, particularly if not masked properly, leaving minute holes in the airfoil surfaces.

Figure 2:
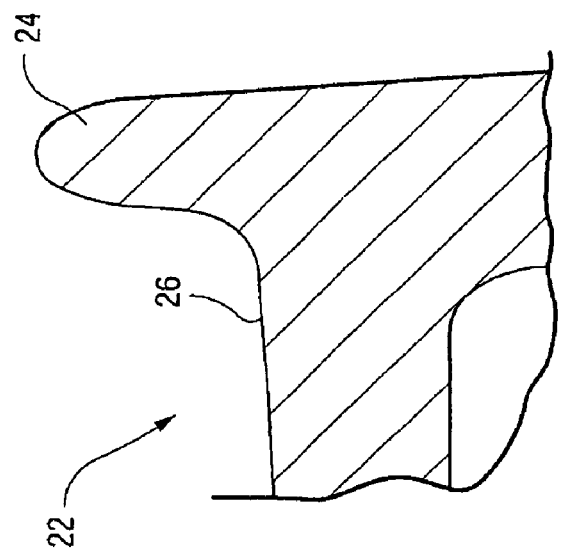
FIG. 2 is a partial cross-section through the cast-in tip cap shown in FIG. 1.

FIG. 2 shows an enlarged detail of the cast-in tip cap 22, with a peripheral rim 24 at the radially outer end of the airfoil portion 12, extending above or outwardly of the end closure portion 26 of the tip cap.

Figure 5:
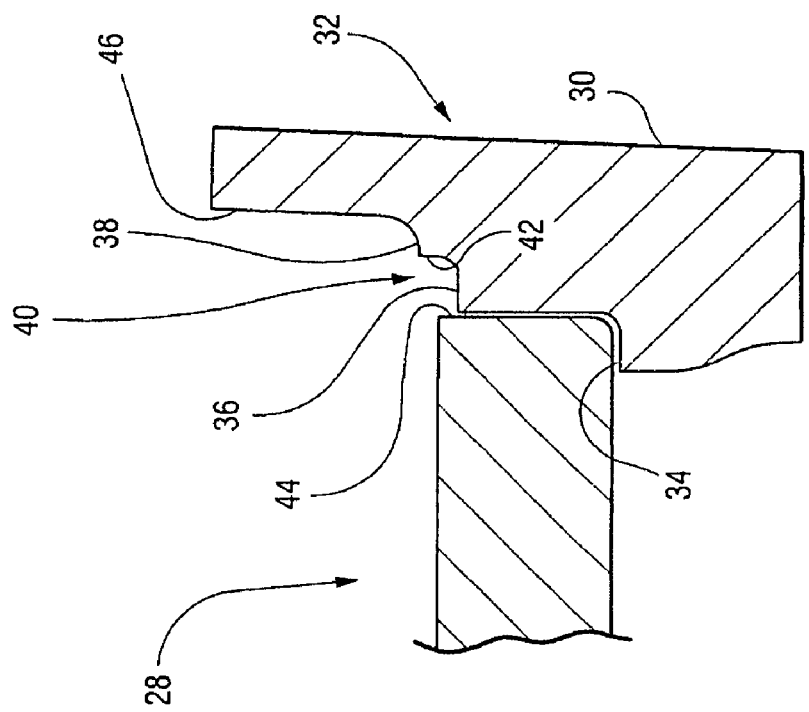
FIG. 5 is a partial cross-section of a tip cap on the airfoil in accordance with an exemplary embodiment of this invention.
Figure 3:
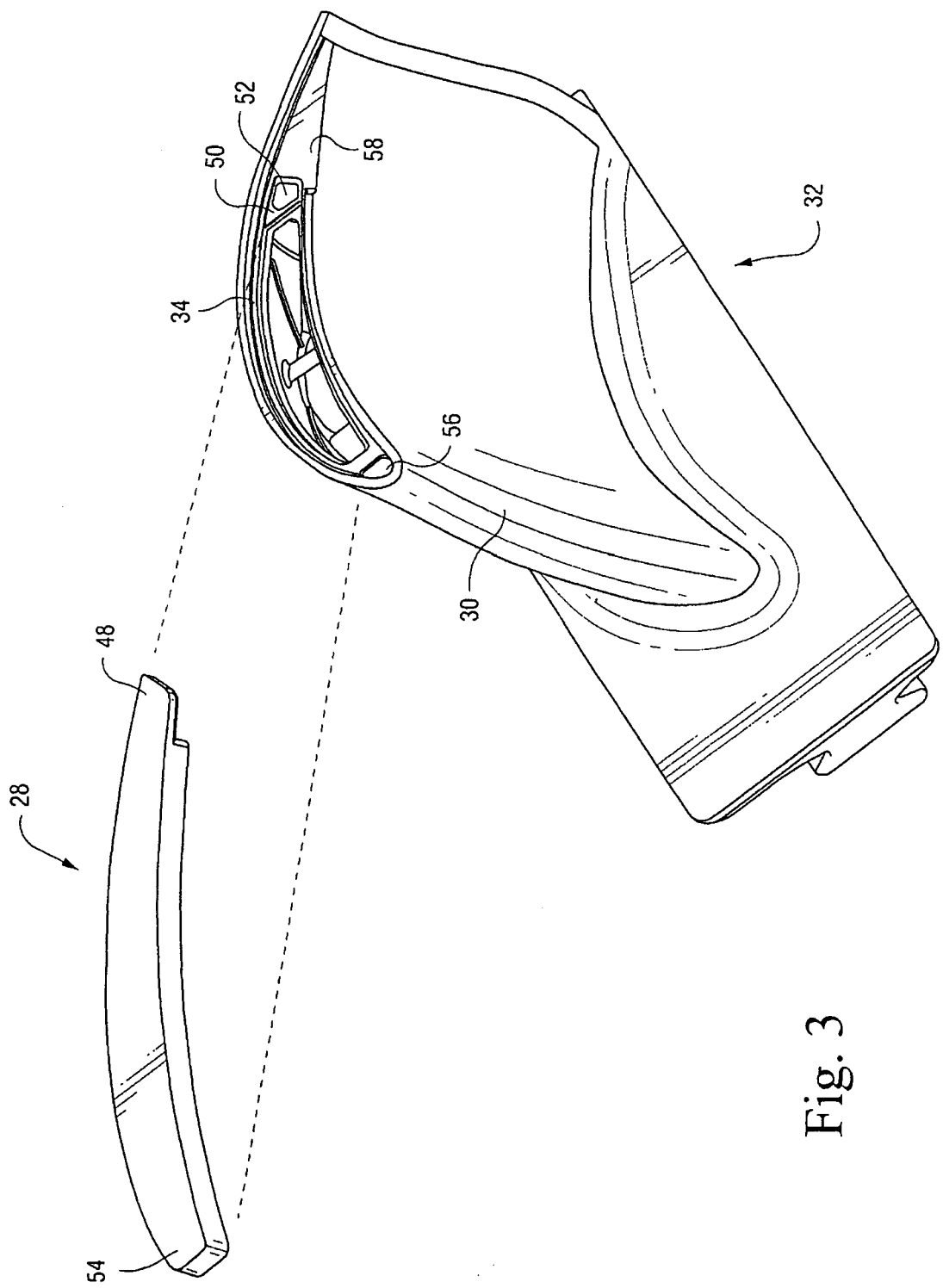
FIG. 3 is a partial perspective view in exploded form, illustrating the discrete tip cap and airfoil in accordance with this invention.
Figure 4:
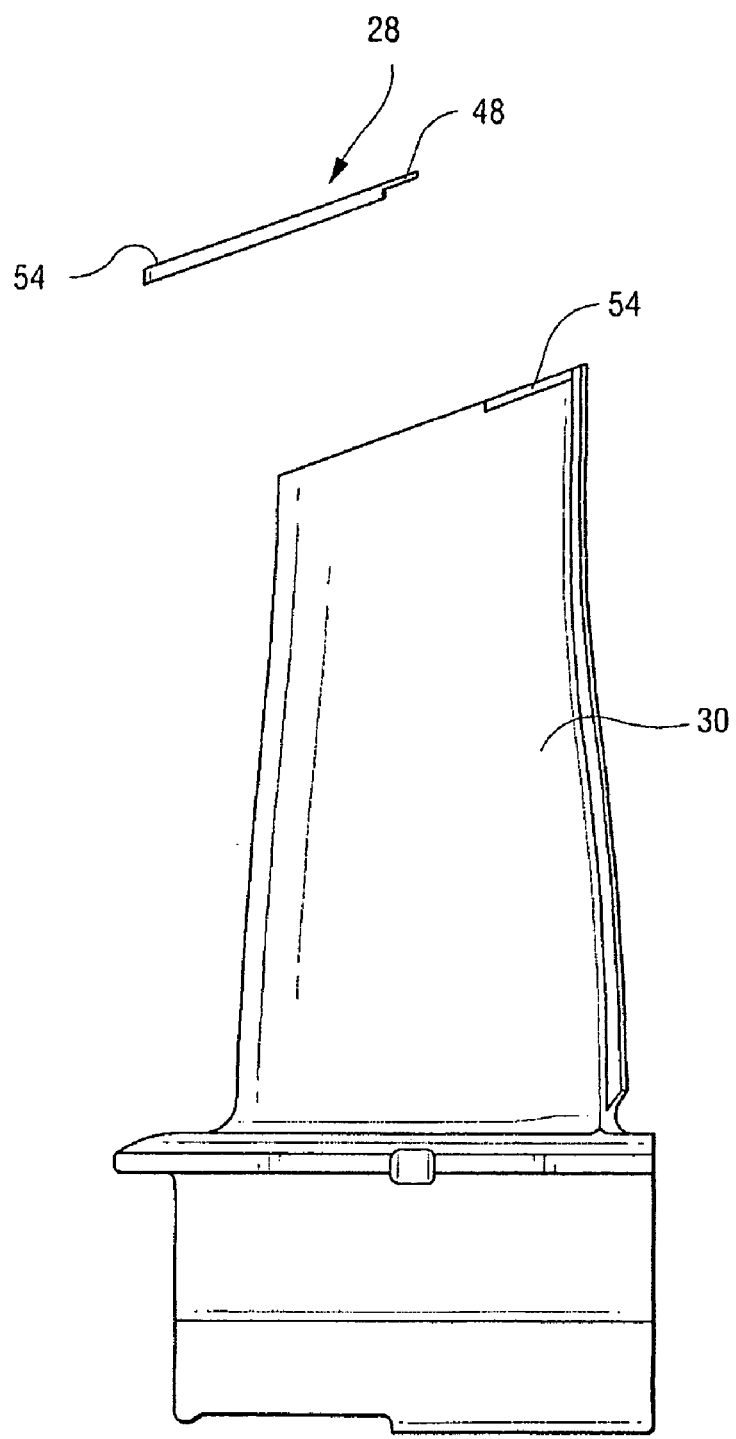
FIG. 4 is a side elevation, also in exploded form, of the tip cap and airfoil shown in FIG. 3.

FIGS. 3-5 show a redesigned, discrete tip cap 28 in accordance with an exemplary embodiment of this invention, for attachment, via welding, to the outer end of the airfoil portion 30 of a turbine blade 32. To facilitate attachment, the radially outermost open end of the airfoil portion 30 is formed with inwardly facing peripheral shoulders 34, 36 and 38 (see the enlarged detail in FIG. 5). Shoulder 34 provides a seat for the discrete planar tip cap 28, which has a thickness of 0.100 inch in a majority of the tip cap with a reduced thickness near the trailing end of the cap as described below. A groove 40 is defined by shoulder 36 and a first airfoil surface 42, along with an edge portion 44 of the tip cap 28. The groove terminates at shoulder 38 that transitions to a second surface 46 of the airfoil.

The groove 40 receives weld material about the periphery of the tip cap 28 to secure the cap to the airfoil.

Note that the tip cap varies in thickness at its trailing end. Specifically, trailing end portion 48 of the tip cap 28 has a reduced thickness that accommodates a raised trailing edge internal portion 50 in the airfoil, incorporating a trailing edge hole 52. Portion 48 of the tip cap closes off the hole 52. Note also that the forward or leading edge 54 of the tip cap 28 leaves a leading hole 56 exposed, and that the trailing end portion 48 of the tip cap terminates at a solid trailing edge portion 58 of the blade. From FIG. 3, it can be seen that the tip cap 28 is supported only about its peripheral edge, with no mid-span support provided within the airfoil. When secured in place, the tip cap 28 lies substantially flush with airfoil surface.

FIG. 4 illustrates the angled nature of the radially outer edge of the airfoil 30. Specifically, the edge, and thus, also the tip cap 28, lie at about a 20° angle to horizontal. While this orientation provides additional complexity for robotic welding of the tip cap, the benefits of the discrete tip cap are significant. Specifically, with this arrangement, a blade can be cast with the core support secured at both the top and bottom (i.e. at the radially inner and outer ends) of the blade, eliminating the need for core support pins. As such, after a service interval, the blade can be stripped and re-coated in accordance with the usual practice, but without the prior problems associated with core support pins. Thus, the repair "fall out" rate is significantly reduced and service life increased.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A turbine blade comprising an airfoil portion defined by a leading edge, a trailing edge, a pressure side, a suction side and a radially outer edge inclined by about 20° relative to horizontal; a discrete tip cap secured to said radially outer edge of said airfoil portion, a radially inner surface of said tip cap seated on a peripheral shoulder formed in said radially outer end of said airfoil portion, and wherein a majority of said tip cap has a first thickness, and a trailing edge portion of said tip cap has a second, reduced thickness.

2. The turbine blade of claim 1 including second and third shoulders that cooperate with an edge of said tip cap to form a peripheral groove about the said tip cap.

3. The turbine blade of claim 2 wherein said discrete tip cap is welded to said airfoil portion, with weld material applied in said peripheral groove.

4. The turbine blade of claim 1 wherein said majority of said tip cap has a thickness of about 0.100 inch.

\* \* \* \* \*